US012175495B2

(12) United States Patent
Bermeister et al.

(10) Patent No.: US 12,175,495 B2
(45) Date of Patent: *Dec. 24, 2024

(54) USER-MANAGED CONTENT AND ADVERTISING DELIVERY BASED ON SIMILARITY COHORTS

(71) Applicant: GLOBAL FILE SYSTEMS, INC., Sherman Oaks, CA (US)

(72) Inventors: Kevin Bermeister, Sydney (AU); Xinghao Yu, Ashfield (AU)

(73) Assignee: GLOBAL FILE SYSTEMS, INC., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,702

(22) Filed: Nov. 20, 2022

(65) Prior Publication Data

US 2023/0145331 A1    May 11, 2023

Related U.S. Application Data

(63) Continuation of application No. 17/152,027, filed on Jan. 19, 2021, now Pat. No. 11,538,065, which is a
(Continued)

(51) Int. Cl.
*G06Q 30/0251* (2023.01)
*G06F 16/22* (2019.01)
(Continued)

(52) U.S. Cl.
CPC ..... *G06Q 30/0255* (2013.01); *G06F 16/2282* (2019.01); *G06Q 20/367* (2013.01);
(Continued)

(58) Field of Classification Search
CPC ............. G06Q 30/0255; G06Q 20/367; G06Q 30/0204; G06Q 30/0236; G06Q 30/0239;
(Continued)

(56) References Cited

U.S. PATENT DOCUMENTS 8,955,007 B2   2/2015 Yanko
9,799,041 B2 * 10/2017 Karty ..................... G06N 3/126
(Continued)

FOREIGN PATENT DOCUMENTS

CA       2613805 A1 *  6/2008 ............. G06Q 30/02
CN     105120348 A     12/2015
(Continued)

OTHER PUBLICATIONS

JPO, Notice of Reasons for Refusal for Japanese Application No. 2021-501271, Mar. 14, 2023. (15 pages).
(Continued)

*Primary Examiner* — Marie P Brady
(74) *Attorney, Agent, or Firm* — Siritzky Law, PLLC

(57) ABSTRACT

A computer-based content delivery method includes receiving from a first user a request for content; based on said request, delivering particular content to said first user, wherein said particular content was selected based on information associated with a second user distinct from said first user. The first second users are members of a similarity group, and the second user is a leader of said group and said first user is a follower in said group.

18 Claims, 9 Drawing Sheets

Related U.S. Application Data continuation of application No. PCT/IB2019/055945, filed on Jul. 12, 2019.

(60) Provisional application No. 62/703,840, filed on Jul. 26, 2018.

(51) Int. Cl.
  *G06Q 20/36* (2012.01)
  *G06Q 30/0204* (2023.01)
  *G06Q 30/0207* (2023.01)
  *G06Q 40/02* (2023.01)

(52) U.S. Cl.
  CPC ..... *G06Q 30/0204* (2013.01); *G06Q 30/0236* (2013.01); *G06Q 30/0239* (2013.01); *G06Q 30/0215* (2013.01); *G06Q 40/02* (2013.01); *G06Q 2220/00* (2013.01); *G06Q 2230/00* (2013.01)

(58) Field of Classification Search
  CPC .............. G06Q 30/0215; G06Q 40/02; G06Q 2220/00; G06Q 2230/00; G06Q 50/01; G06Q 30/0217; G06Q 50/10; G06Q 30/0207; G06Q 30/0257; G06F 16/2282; H04L 2209/56; H04L 9/3239; H04L 9/50
  See application file for complete search history.

(56) References Cited

U.S. PATENT DOCUMENTS

| | | | | |
|---|---|---|---|---|
| 9,875,477 | B2* | 1/2018 | Glore, Jr. | ........... G06Q 30/0239 |
| 10,423,880 | B2 | 9/2019 | Wilson et al. | |
| 2001/0037232 | A1 | 11/2001 | Miller | |
| 2005/0149397 | A1* | 7/2005 | Morgenstern | .......... G06Q 30/02 705/14.66 |
| 2006/0004600 | A1* | 1/2006 | Summer | ............ G06Q 30/0269 705/1.1 |
| 2008/0140506 | A1* | 6/2008 | Christianson | ...... G06Q 30/0245 705/14.44 |
| 2010/0161398 | A1* | 6/2010 | Albert | ................ G06Q 30/0269 705/26.1 |
| 2011/0153424 | A1* | 6/2011 | Huang | ................ G06Q 30/0255 705/14.49 |
| 2012/0078713 | A1 | 3/2012 | Smith et al. | |
| 2012/0151516 | A1 | 6/2012 | Yanko | |
| 2012/0259786 | A1* | 10/2012 | Cowan | ................ H04N 21/2542 709/204 |
| 2013/0018730 | A1* | 1/2013 | Morris | ............... G06Q 30/0251 705/14.69 |
| 2014/0150016 | A1 | 5/2014 | Feng et al. | |
| 2015/0220982 | A1* | 8/2015 | Dilenno | ............. G06Q 30/0269 705/14.1 |
| 2015/0262245 | A1* | 9/2015 | Arvanitis | ........... G06Q 30/0269 705/14.35 |
| 2015/0317666 | A1* | 11/2015 | Pygnasak | ........... G06Q 30/0226 705/14.27 |
| 2015/0324827 | A1 | 11/2015 | Upstone et al. | |
| 2016/0055417 | A1 | 2/2016 | Wilson et al. | |
| 2016/0140789 | A1* | 5/2016 | Wickersham, III | ... H04W 4/021 705/12 |
| 2021/0279760 | A1* | 9/2021 | Bogomilsky | ...... G06Q 30/0226 |

FOREIGN PATENT DOCUMENTS

| | | | |
|---|---|---|---|
| CN | 105279204 | A | 1/2016 |
| CN | 106294778 | A | 1/2017 |
| GB | 2448136 | A | 10/2008 |
| IN | 107103057 | A | 8/2017 |
| JP | 2012079317 | A | 4/2012 |
| JP | 2015515665 | A | 5/2015 |
| JP | 2018101323 | A | 6/2018 |
| KR | 101337455 | B1 | 12/2013 |
| WO | 2013131096 | A1 | 9/2013 |
| WO | 2013190366 | A1 | 12/2013 |
| WO | WO-2015148693 | A1 * | 10/2015 ......... G06F 16/2358 |
| WO | WO-2017038177 | A1 * | 3/2017 ......... G01C 21/3679 |

OTHER PUBLICATIONS

PCT, International Search Report from International Application No. PCT/IB2019/055945, Dec. 24, 2019. (3 pages).
PCT, Written Opinion of the International Searching Authority from International Application No. PCT/IB2019/055945, Dec. 24, 2019. (10 pages).
CNIPA, Peer ISA for International Application No. PCT/IB2019/055945, Nov. 15, 2019. (9 pages).
USPTO, Peer ISA for International Application No. PCT/IB2019/055945, Nov. 25, 2019. (12 pages).
EPO, Peer ISA for International Application No. PCT/IB2019/055945, Nov. 21, 2019. (14 pages).
JPO, Peer ISA for International Application No. PCT/IB2019/055945, Nov. 21, 2019. (9 pages).
EPO, Extended European Search Report for European Application No. 19841266.0, Nov. 21, 2021. (10 pages).

* cited by examiner

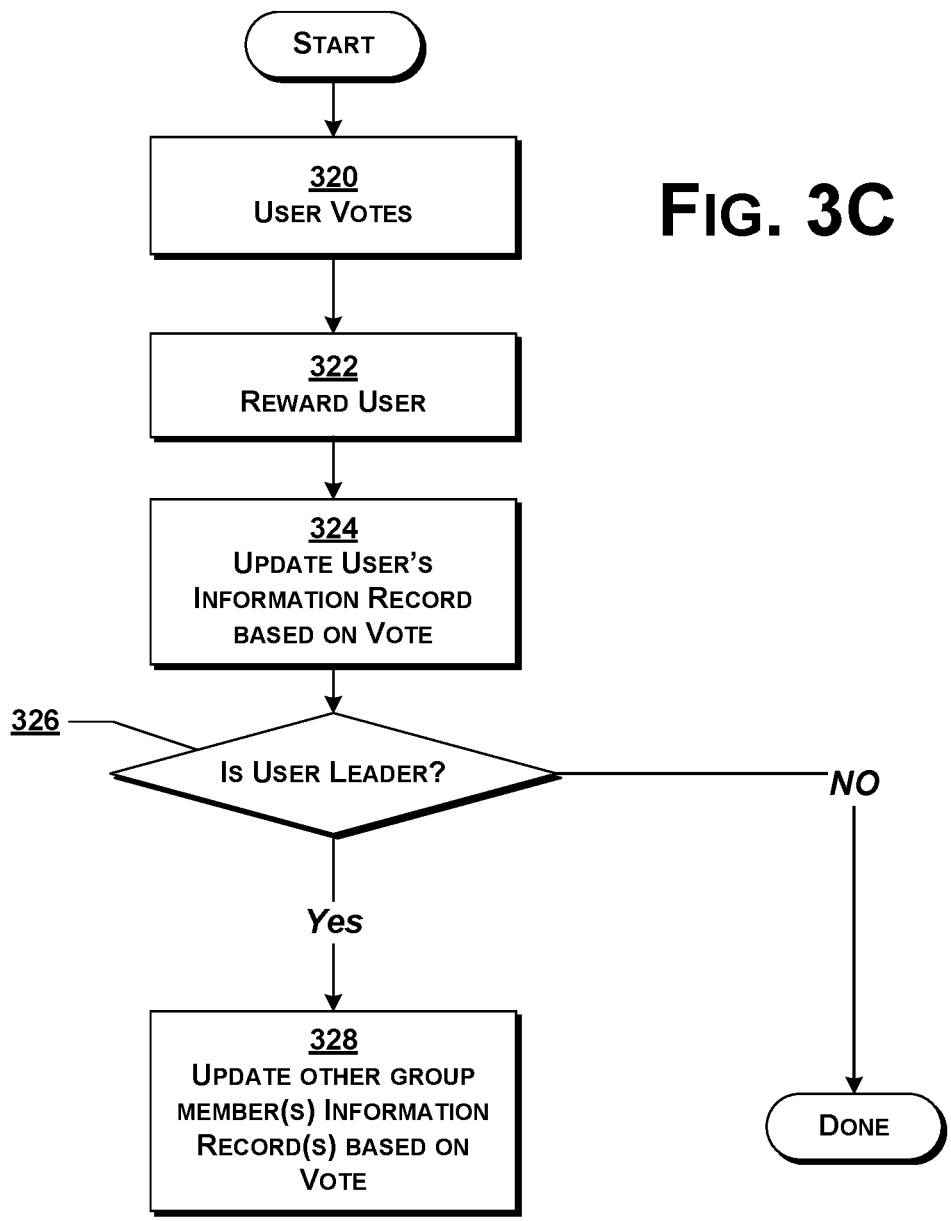

| USER DATA | | |
|---|---|---|
| USER ID | USER INFORMATION RECORD | USER GROUP(S) |
| USER #1 | USER #1 INFORMATION RECORD | USER #1 GROUPS |
| USER #2 | USER #2 INFORMATION RECORD | USER #2 GROUP(S) |
| ⋮ | ⋮ | ⋮ |
| USER #k ID | USER #k INFORMATION RECORD | USER #k GROUPS |

FIG. 4B — 404

| GROUP ID | USER INFORMATION RECORD | CURRENT LEADER(S) |
|---|---|---|
| GROUP #1 | GROUP #1 MEMBERS | GROUP #1 LEADER(S) |
| GROUP #2 | GROUP #2 MEMBERS | GROUP #2 LEADER(S) |
| ⋮ | ⋮ | ⋮ |
| GROUP #J | GROUP #J MEMBERS | GROUP #J LEADER(S) |

GROUP DATA

USER-MANAGED CONTENT AND ADVERTISING DELIVERY BASED ON SIMILARITY COHORTS

RELATED APPLICATION

This application is a continuation of patent application Ser. No. 17/152,027, filed Jan. 19, 2021, which is a continuation of PCT/IB2019/055945, filed Dec. 7, 2019, published as WO/2020/021376 on Jan. 30, 2020, which claims priority/the benefit of U.S. Provisional patent application No. 62/703,840, filed Jul. 26, 2018, the entire contents of each of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention generally relates to the delivery of content, and in particular, to a system and method for delivering content and advertising to one or more participants based on their similarity to other users.

BACKGROUND

Targeted content and advertising delivery is ubiquitous and underlies much of today's content delivery on the Internet. Content providers and advertisers strive to deliver appropriate content and advertisements to users based on those users' respective interests and needs. In order to determine a particular user's interests and needs, information needs to be collected about that user. Many social network platforms (such as, e.g., Facebook, Twitter, etc.) gather user information to be used for targeted content and advertisement delivery. However, not all users use such platforms, and not all users provide sufficient information for appropriate targeted content and advertisement delivery.

Furthermore, while users may have a tacit understanding that information about their computer usage is tracked; they are typically unaware of the degree of this tracking or of the use of their data. In addition, most data collected about users is obtained without their knowledge or consent and without any compensation.

It is desirable, and an object hereof, to enable users to provide improved information for profiling and corresponding targeting.

It is further desirable, and a further object hereof to respond appropriately and immediately to content (e.g., advertising) preferences indicated by users.

It is further desirable, and a further object hereof to reward or compensate users for providing their information.

It is further desirable, and a further object hereof to obtain user's permission for use of their content preferences.

SUMMARY

The present invention is specified in the claims as well as in the description.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-based content delivery method including: receiving from a first user a request for content. The method also includes, based on the request, delivering particular content to the first user, where the particular content was selected for delivery based on first information associated with the first user. The method also includes where the first information associated with the first user was based, at least in part, on at least one aspect of second information associated with a second user distinct from the first user. The method also includes where the first user and the second user are associated based on at least one measure of similarity. The method also includes where the at least one aspect of the second information associated with the second user was selected based on the second user's prior use of a voting mechanism associated with certain prior content delivery.

Other embodiments of this aspect include corresponding computer systems, apparatus, and computer programs recorded on one or more computer storage devices, each configured to perform the actions of the methods.

Implementations may include one or more of the following features, alone and/or in combination:

The method where the first user and the second user are members of a similarity group, and wherein, at the time of the request, the second user is a leader of the group and the first user is a follower in the group.

The method where the group is a similarity group, and wherein membership of the group was determined based on one or more measures of similarity of the group's members.

The method where the one or more measures of similarity are based on users' environment and domain activity with respect to other users.

The method where the environment comprises one or more of: a LAN, a WAN, a wireless network, a router a gateway, an application, and a device.

The method where the domain comprises a location on the Internet.

The method further comprising logging one or more of a user's environment and/or domain activity to compare with those of other users the environment and/or domain.

The method where a group is based on at least one measure of similarity of users' domain and/or environment logs and/or real time data streams.

The method where similarity is based, at least in part, on one or more of: frequency of visitation, date, duration within the environment or at the domain, as determined from the logs or real time data streams.

The method where a tolerance factor is used to determine membership of the similarity group.

The method where the second user is rewarded based on delivery of the particular content to the first user.

The method where certain content is delivered with a voting mechanism, and wherein users are rewarded for their receipt and display of the voting mechanism.

The method where users are rewarded for their use of the voting mechanism.

The method where users are rewarded for their use of the voting mechanism, regardless of how the users vote.

The method where the voting mechanism associated with certain prior content delivery supported a user vote against the prior content.

The method where n the second user's prior use of the voting mechanism associated with the certain prior content delivery comprised a negative vote by the second user.

The method where the second user's prior use of the voting mechanism associated with the certain prior content delivery comprised a positive vote by the second user.

The method where the second user was previously rewarded for their receipt and display of the voting mechanism associated with the certain prior content delivery.

The method where the second user was previously rewarded for the second user's use of the voting mechanism associated with the certain prior content delivery.

The method where leadership of the similarity group is determined based, at least in part, on one or more user's prior use of a voting mechanism associated with certain prior content delivery.

The method where leadership of the similarity group is dynamic

The method where the particular content comprises targeted advertising.

The method where the voting mechanism associated with the certain prior content delivery was delivered by an advertising server.

The method where the particular content was delivered by an advertising server.

The method where the voting mechanism was delivered as part of the certain prior content delivery.

The method where the certain prior content delivery comprised data in a markup and/or interpreted language and wherein the voting mechanism is part of the data.

The method where the first user and the second user were associated prior to receiving the request.

The method where the particular content comprises a second voting mechanism.

The method where the first information associated with the first user comprises a first information record associated with the first user.

Another general aspect includes a computer-based content delivery method including: receiving from a first user a request for content. The method also includes, based on the request, delivering particular content to the first user, where the particular content includes a voting mechanism, where the particular content was selected for delivery based on first information associated with the first user. The method also includes rewarding the first user for receiving and displaying the particular content and one or more images associated with the voting mechanism.

Other embodiments of this aspect include corresponding computer systems, apparatus, and computer programs recorded on one or more computer storage devices, each configured to perform the actions of the methods.

Implementations may include one or more of the following features, alone and/or in combination:

The method where the voting mechanism provides a user interface (UI) supporting voting on the particular content, and where the one or more images include the UI.

The method where the UI includes the one or more images associated with the voting mechanism.

The method further including rewarding the user for registering an opinion using the voting mechanism.

The method where the first information associated with the first user includes a first information record associated with the first user, and where the second information associated with the second user includes a second information record associated with the second user.

Implementations of the described techniques may include hardware, a method or process, or computer software on a computer-accessible medium.

Another general aspect includes a computer-readable medium with one or more computer programs stored therein that, when executed by one or more processors of a device, cause the one or more processors to perform the operations of any of the previously noted methods. Implementations may include where the medium is non-transitory.

Below, further numbered embodiments of the invention will be discussed.

Below is a list of method (or process) embodiments. Those will be indicated with a letter "M". Whenever such embodiments are referred to, this will be done by referring to "M" embodiments.

M1. A computer-based content delivery method comprising:
  receiving from a first user a request for content;
  based on said request, delivering particular content to said first user, wherein said particular content was selected for delivery based on first information associated with said first user,
  wherein the first information associated with the first user was based, at least in part, on at least one aspect of second information associated with a second user distinct from said first user, and
  wherein the first user and the second user are associated based on at least one measure of similarity, and
  wherein the at least one aspect of the second information associated with the second user was selected based on the second user's prior use of a voting mechanism associated with certain prior content delivery.

M2. The method of embodiment M1, wherein said first user and said second user are members of a similarity group, and wherein, at the time of said request, said second user is a leader of said group and said first user is a follower in said group.

M3. The method of embodiment M2, wherein said group is a similarity group, and wherein membership of said group was determined based on one or more measures of similarity of the group's members.

M4. The method of embodiment M2, wherein said one or more measures of similarity are based on users' environment and domain activity with respect to other users.

M5. The method of embodiment M4, wherein the environment comprises one or more of: a LAN, a WAN, a wireless network, a router a gateway, an application, and a device.

M6. The method of embodiments M4 or M5, wherein the domain comprises a location on the Internet.

M7. The method of any one of embodiments M3-M6, further comprising logging one or more of a user's environment and/or domain activity to compare with those of other users the environment and/or domain.

M8. The method of any one of embodiments M3-M7, wherein a group is based on at least one measure of similarity of users' domain and/or environment logs and/or real time data streams.

M9. The method of any one of embodiments M3-M8, wherein similarity is based, at least in part, on one or more of: frequency of visitation, date, duration within the environment or at the domain, as determined from the logs or real time data streams.

M10. The method of any one of embodiments M3-M9, wherein a tolerance factor is used to determine membership of the similarity group.

M11. The method of any one of the preceding embodiments, wherein the second user is rewarded based on delivery of said particular content to said first user.

M12. The method of any one of the preceding embodiments, wherein certain content is delivered with a voting mechanism, and wherein users are rewarded for their receipt and display of the voting mechanism.

M13. The method of any one of the preceding embodiments wherein users are rewarded for their use of the voting mechanism.

M14. The method of embodiment M13, wherein users are rewarded for their use of the voting mechanism, regardless of how the users vote.

M15. The method of any one of the preceding embodiments, wherein the voting mechanism associated with certain prior content delivery supported a user vote against the prior content.

M16. The method of any one of the preceding embodiments, wherein the second user's prior use of the voting mechanism associated with said certain prior content delivery comprised a negative vote by said second user.

M17. The method of any one of embodiments M1-M15, wherein the second user's prior use of the voting mechanism associated with said certain prior content delivery comprised a positive vote by said second user.

M18. The method of any one of the preceding embodiments, wherein the second user was previously rewarded for their receipt and display of the voting mechanism associated with said certain prior content delivery.

M19. The method of any one of the preceding embodiments, wherein the second user was previously rewarded for the second user's use of the voting mechanism associated with said certain prior content delivery.

M20. The method of any one of embodiments M2-M19, wherein leadership of the similarity group is determined based, at least in part, on one or more user's prior use of a voting mechanism associated with certain prior content delivery.

M21. The method of any one of embodiments M2-M20, wherein leadership of the similarity group is dynamic M22. The method of any one of the preceding embodiments, wherein the particular content comprises targeted advertising.

M23. The method of any one of the preceding embodiments, wherein the voting mechanism associated with said certain prior content delivery was delivered by an advertising server.

M24. The method of any one of the preceding embodiments, wherein the particular content was delivered by an advertising server.

M25. The method of any one of the preceding embodiments wherein said voting mechanism was delivered as part of said certain prior content delivery.

M26. The method of embodiment M25, wherein said certain prior content delivery comprised data in a markup and/or interpreted language and wherein said voting mechanism is part of said data.

M27. The method of any one of the preceding embodiments wherein said first user and said second user were associated prior to receiving said request.

M28. The method of any one of the preceding embodiments, wherein said particular content comprises a second voting mechanism.

M29. A computer-based content delivery method comprising:
receiving from a first user a request for content;
based on said request, delivering particular content to said first user, wherein said particular content comprises a voting mechanism, wherein said particular content was selected for delivery based on first information associated with said first user; and
rewarding said first user for receiving and displaying said particular content and one or more images associated with said voting mechanism.

M30. The method of embodiment M29, wherein said voting mechanism provides a user interface (UI) supporting voting on said particular content, and wherein said one or more images comprise said UI.

M31. The method of embodiment M30, wherein said UI comprises said one or more images associated with said voting mechanism.

M32. The method of any one of embodiments M29-M31, further comprising: rewarding the user for registering an opinion using said voting mechanism.

M33. The method of any one of embodiments M1-M32, wherein the first information associated with the first user comprises a first information record associated with the first user, and wherein the second information associated with the second user comprises a second information record associated with the second user.

Below is a list of computer-readable medium embodiments. Those will be indicated with a letter "C". Whenever such embodiments are referred to, this will be done by referring to "C" embodiments.

C34. A computer-readable medium with one or more computer programs stored therein that, when executed by one or more processors of a device, cause the one or more processors to perform the operations of: the method of any one of embodiments M1-M33.

C35. The computer-readable medium of embodiment C34, wherein the medium is non-transitory.

The above features along with additional details of the invention are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIGS. 3A-3C are flow charts showing operation of exemplary embodiments hereof;

FIGS. 4A-4B are data structures according to exemplary embodiments hereof;

DETAILED DESCRIPTION OF THE PRESENTLY PREFERRED EXEMPLARY EMBODIMENTS

Figure 1:
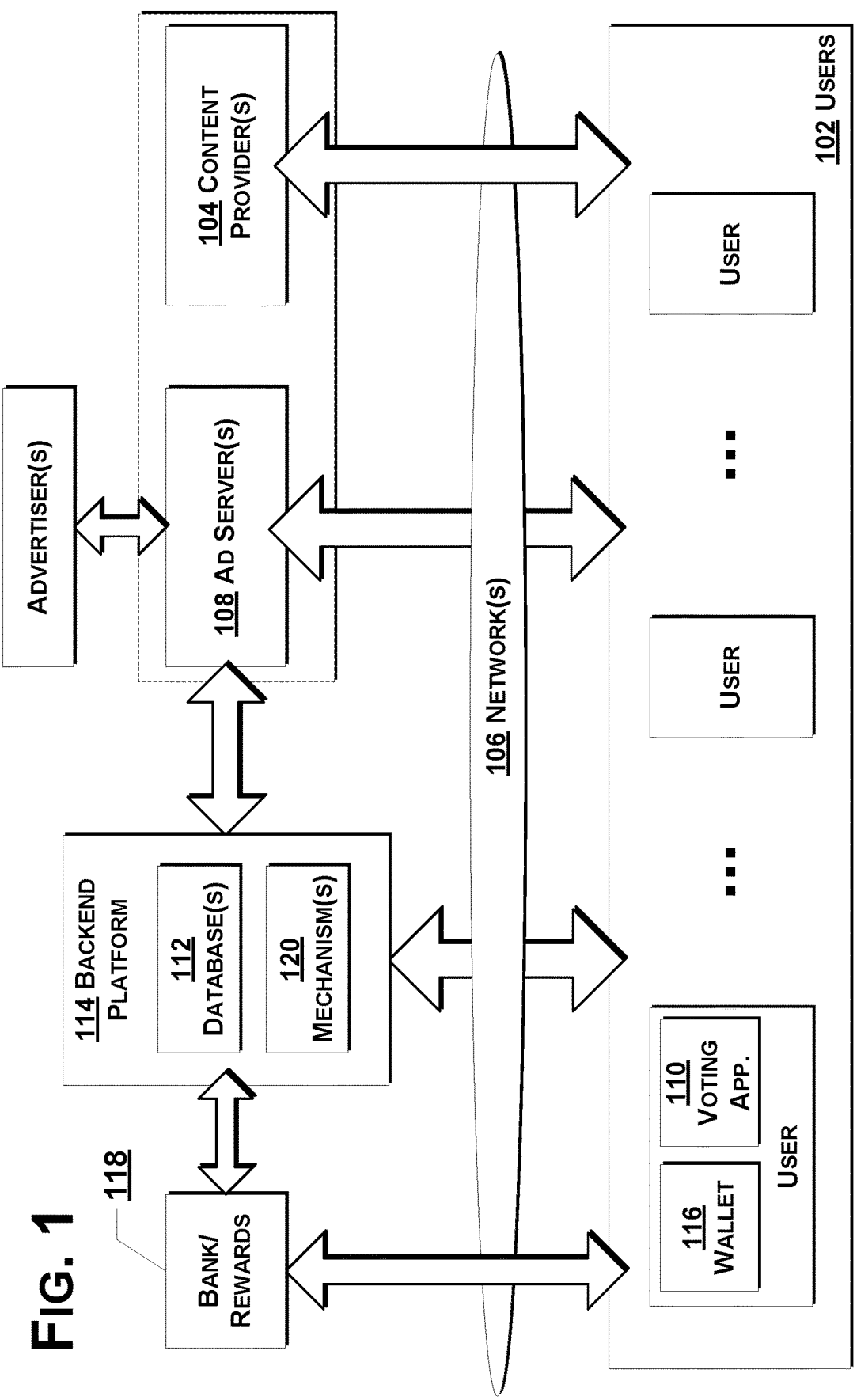
FIG. 1 depicts aspects a system according to exemplary embodiments hereof.

In the following, exemplary embodiments of the invention will be described, referring to the figures. These examples are provided to provide further understanding of the invention, without limiting its scope.

In the following description, a series of features and/or acts are described.

The skilled person will appreciate that unless required by the context, the order of features and steps is not critical for the resulting configuration and its effect. Further, it will be apparent to the skilled person that irrespective of the order of features and acts, the presence or absence of time delay between acts, can be present between some or all of the described acts.

Reference numerals have just been referred to for reasons of quicker understanding and are not intended to limit the scope of the present invention in any manner.

Glossary and Abbreviations

As used herein, unless used otherwise, the following terms or abbreviations have the following meanings:

API means application programming interface;
LAN means local area network;
URL means uniform resource locator;
WAN means wide area network, which may include WiFi and mobile or cellular networks.

The term "mechanism," as used herein, refers to any device(s), process(es), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

The following detailed description is not intended to limit the current invention. Alternate embodiments and variations of the subject matter described herein will be apparent to those skilled in the art.

Exemplary methods and systems according to exemplary embodiments hereof are described with reference to the drawings.

With reference to FIG. 1, in a system according to exemplary embodiments hereof, multiple users 102 obtain content from multiple content providers 104 via one or more networks 106 (e.g., the Internet, LANs, WANs, etc.) The content may comprise, e.g., web pages from web providers.

The content received by a specific user may be generic content or customized for that user. Additionally, the content received by a user may include links or the like to advertising to be associated with the content. For example, the content may be a web page with multiple links to various adverts or an application on a mobile device.

In preferred implementations, each link associated with delivered content is resolved as the content is being rendered (e.g., displayed) on the user's device. During this rendering process, links associated with advertising may resolve to one or more advertising servers 108 which then deliver adverts to the user to be rendered as part of content delivery process.

As should be appreciated, advertisements are essentially content or a kind of content and thus advertising servers 108 may be considered content provider servers (albeit usually for a particular kind of content).

Furthermore, user-customized content, especially advertising content, is generally bound to a particular user using late binding. That is, user-customized content such advertising is usually picked soon or immediately before being delivered to the user.

User-customized content may be delivered to a user based on information about that user, e.g., stored on the user's device. For example, a user's information and preferences may be stored on the user's device (e.g., in so-called cookies) and that information and preferences may be used to determine a binding and delivery of user-customized content to that user. For example, when a user receives a web page with embedded link URLs for advertisements (user-customized content), the user's browser or the like may use those URLs, possibly modified with information stored on the user's device, to select and deliver ads in line with the user's stored information and preferences.

Figure 2:
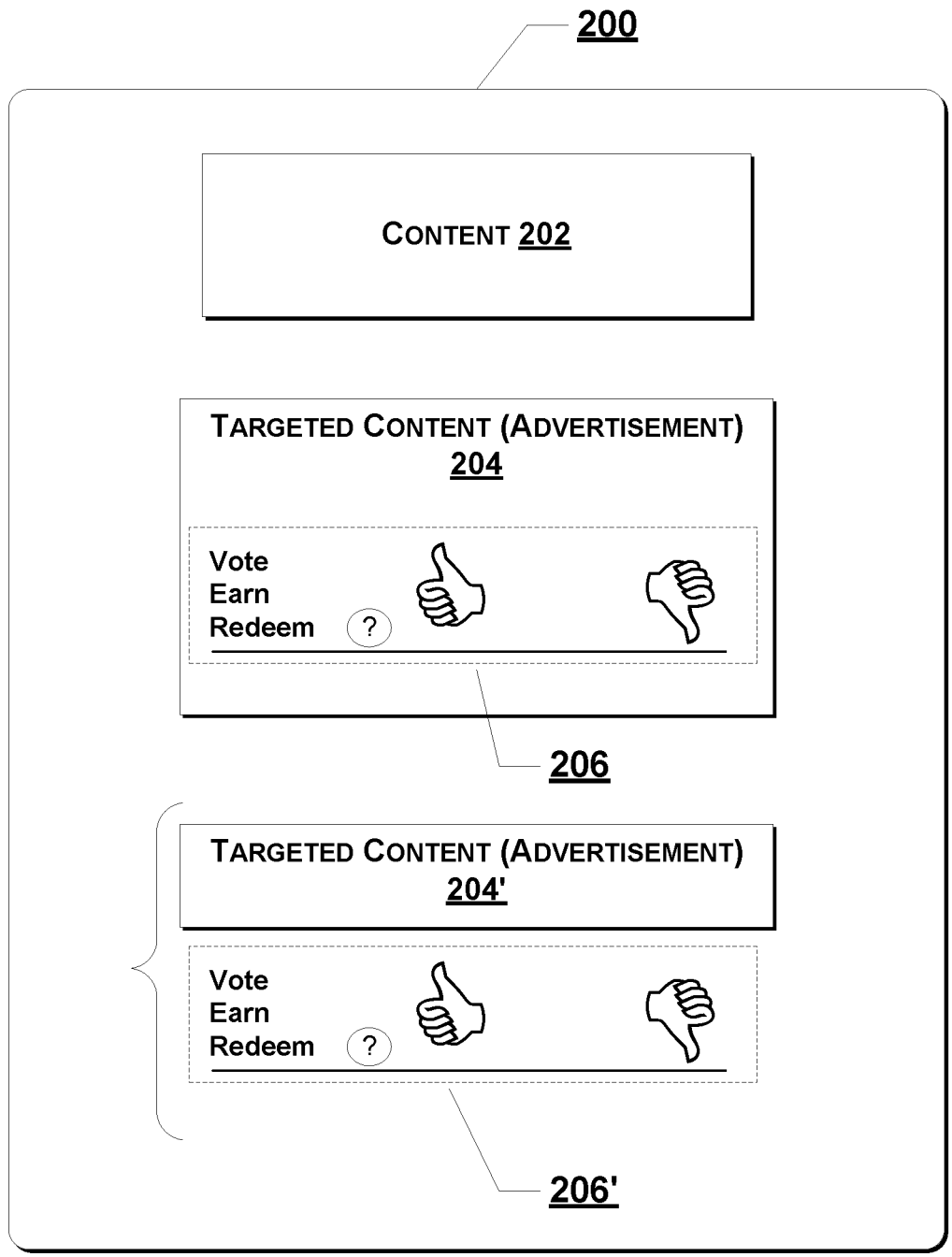
FIG. 2 depicts content rendered on a user display according to exemplary embodiments hereof.

In the example shown in FIG. 2, the user's display 200 shows content 202 (delivered from one or more content providers 104) and targeted content or advertising 204 (delivered to the user from one or more ad servers 108).

In embodiments hereof, some users may be provided with a voting mechanism 110 with certain content, in particular with advertising content (advertising content may be referred to as an ad unit). The voting mechanism 110 is preferably included as part of the content (e.g., as HTML/Java code integrated in the ad unit or delivered with the ad unit). The voting mechanism 110 preferably runs as part of the rendering or running of the corresponding ad unit.

The voting mechanism 110 allows a user to vote on or otherwise rank the associated content (e.g., an advertisement or the like). In one implementation, the voting mechanism provides the user with only two options (e.g., like or dislike implemented with the thumbs up or thumbs down user interface 206 as depicted in FIG. 2, showing approval or disapproval of the corresponding content).

Preferably the voting mechanism 110 is associated with a single advertisement 204, so as to provide finer granularity of information about the user's likes and dislikes (with respect to advertising content). For example, as shown in FIG. 2, the voting mechanism user interface 206 is associated with (and displayed with) targeted content 204, and the voting mechanism user interface 206' is associated with (and displayed with or near) targeted content 204'.

The user's vote on the content may be recorded on the user's device and/or in a database on a backend platform 114. Although shown as a binary (up/down) vote in the example in FIG. 2, the voting mechanism 100 may allow for voting along a continuum or with more than two options. As should be appreciated, since use of the voting mechanism 100 is to be encouraged, it is preferably kept small, simple, and non-intrusive.

In some exemplary embodiments hereof, the system may reward or pay a user for receipt and/or display and/or use of the voting mechanism 110. Rewards may be, e.g., in the form of tokens or the like. In preferred embodiments a user may be unaware of rewards that they have earned from receipt and/or display of the voting mechanism 110 until they actually use the voting mechanism 110 to register a vote. That is, until a user tries to register a vote with a voting mechanism 110, rewards (e.g., tokens) may accumulate on the user's device without the user's knowledge. Once a user tries to register a vote with a voting mechanism 110, the user may be required to register with the system, at which time the user will be provided with a wallet 116 (or with access to an existing wallet). The wallet 116 may contain rewards earned to date. Having used the voting mechanism 110 once, the user is registered and subsequent uses by that user (on that device) will be as the registered user.

The wallet 116 may maintain and store information about rewards made to the user, including rewards made prior to the user's first use of the voting mechanism 110 (e.g., as noted above, for receiving and displaying the UI associated with the voting mechanism). Thus, prior to the user's registration with the system, the user may be identified with a non-human identifier and rewarded, however, they will not be able to receive rewards until they register and associate with a wallet.

A user's wallet 116 preferably stores information about one or more so-called cryptographic tokens (also known as crypto tokens or currencies). The user's wallet 116 may interact with one or more banks or reward systems 118. Although the term "bank" is used here, those of ordinary skill in the art will appreciate and understand, upon reading this description, that a "bank" 116 may comprise one or more decentralized currencies such as crypto currencies. The currency stored in a user's wallet 116 may be in the form of a token or the like, suitable for any type of currency or independent of the currency.

Payment into a user's wallet 116 via a bank 118 will use the appropriate interfaces between the wallet and the bank, depending on the type of token.

Grouping Similar Users

In exemplary embodiments hereof, users 102 may be grouped into one or more groups or cohorts based on one or more measures of similarity. Within each group or cohorts, at least one user is considered a leader and the rest are considered followers. As should be appreciated, the "leader" and "follower" notation is used for the purposes of description and is does not imply any actual or permanent relationship between the users. User's need not know each other or have any relationship other than their similarity, as determined by the system.

A user may be a member of more than one group or cohort. A user may be a leader in one group or cohort and a follower in another.

Furthermore, a user's position may change from leader to follower and vice versa within the same group or cohort.

As should be appreciated, group membership may change as similarity is preferably a dynamic measure.

The grouping and similarity determinations may be made by one more mechanisms 120 on the backend platform 114, and current group information (e.g., membership) may be stored and maintained in one or more databases 112 on the backend platform 114.

Figure 3A:
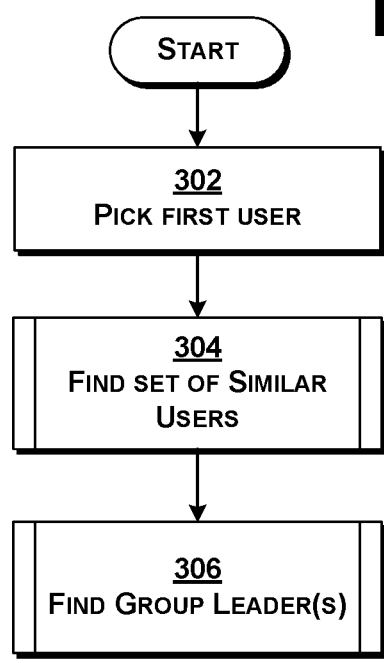

In presently preferred implementations, and with reference to the flowchart in FIG. 3A, a first user is selected (at 302) and then a cohort or group is of similar users is determined (at 304). The first user may be selected based, e.g., on an amount of information already known about that user as well as the recency of that user's interactions with the system, including via a voting mechanism. Users who regularly use the voting mechanism (when available) may be more likely to be chosen as a "first" user.

With a first user chosen, the system may then find a set of similar users (as described below) to form a cohort. The first user (used to start or seed the group in 302) may not be the leader of the group once the group has been formed. Thus, after the group is formed, one or more group leaders may be selected (at 306) from the current members of the group. According to some exemplary embodiments hereof, the user with the most similar cohort members may be considered the leader, with the understanding that this may replace the first user as leader.

Since multiple group members may have the same number of similar group members, there may be multiple group leaders.

User similarity and thus group membership may change over time, as may group leadership. Thus, groups may be dynamically formed, on the fly, in real time, or they may be formed and then reviewed and revised as needed or on some routine basis.

Once a group and group leader have been determined, content, in particular user-targeted advertising, may be served to followers in a group based on information about the group's leaders. Thus, when a user requests content (e.g., from an advertising server 108), that content may be selected based on information known about that user (as described above) and/or on information know about one or more group leaders of any group in which that user is a member.

Figure 3B:
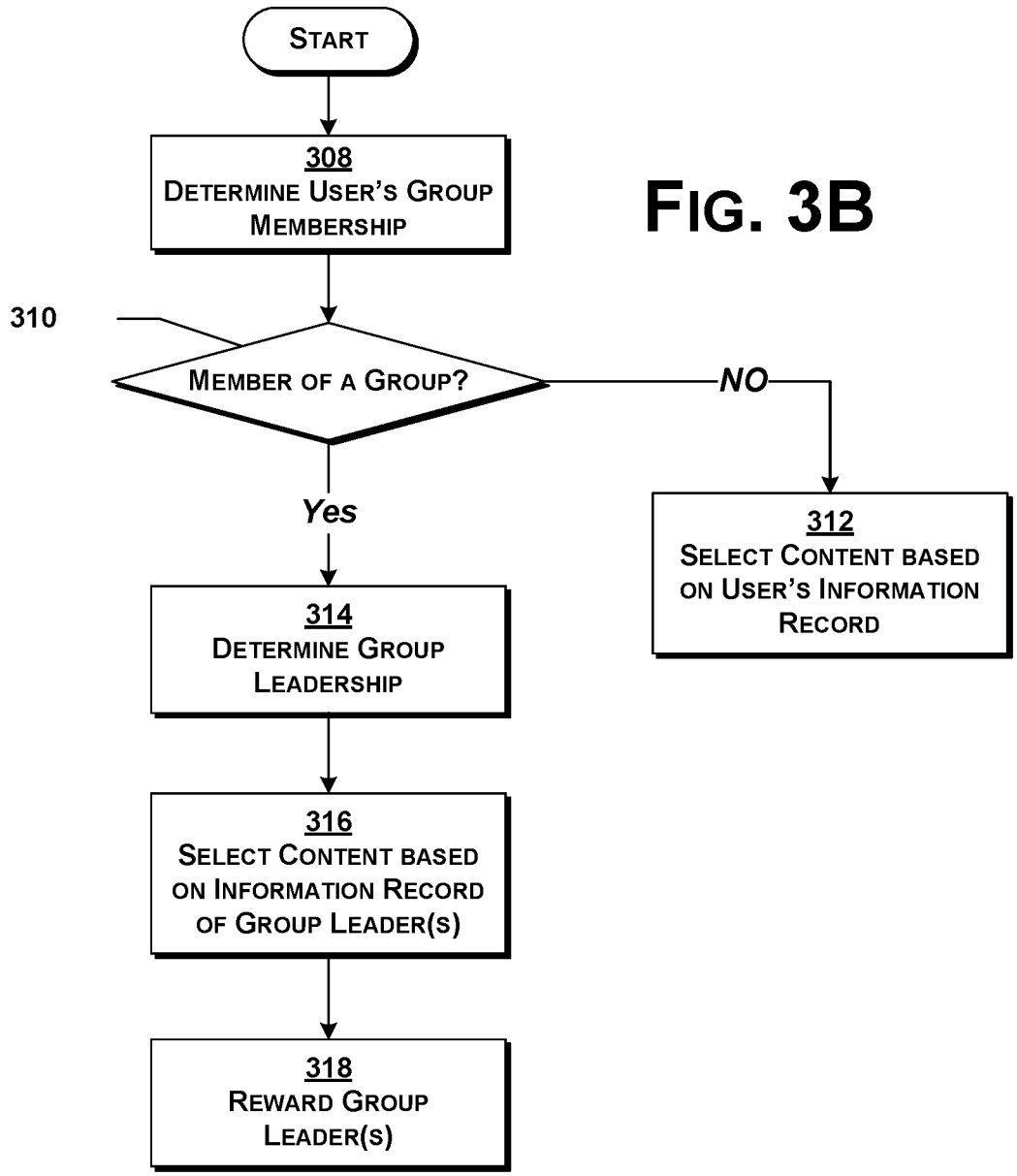

For example, with reference to FIG. 3B, when a user requests content from an advertising server 108, the server 108 may determine that user's group membership (at 308), i.e., the group(s) to which that user belongs. If the user is not a member of any group (as determined at 310), then the user's current information record may be used to select content (at 312). On the other hand, if the user is a member of a group (as determined at 310), the group's leadership is determined (at 314), and the leader's information record may be used (at 316) to select content to be delivered to the user.

As noted above, users may be rewarded for their receipt, display, and/or use of the voting mechanism 110. In some exemplary embodiments hereof, a user may also be rewarded (at 318) when their information record is used (as a group leader information record) to determine content to be delivered to other group members. The user making the request may also be rewarded.

As can be seen, if the user is also the group leader (as determined at 314), then that user's information record will be used (at 316) to determine the content to be served to the user.

In any case, at 316, a user's information record may be used in combination with that of the group leader to select content to be served to the user.

In preferred embodiments, user information records of group members may be updated based on the actions and information records of the group leader(s). For example, as shown in FIG. 3C, when a particular user votes (at 320) using a voting mechanism associated with certain content (regardless of how the particular user votes), that user is rewarded (at 322) and that user's information record is updated (at 324) based on the preference reflected in their vote. Then (at 326), it is determined whether the user is currently a leader of any similarity group(s). If the user is determined (at 326) to be a leader of any similarity groups, the information records of the other similarity group members are updated (at 328) to reflect the particular user's preference reflected in their vote. As noted, group membership is dynamic, as is group leadership. Thus, at the time of the determination in 326 the particular user may be a leader, with the other group members effectively being followers.

In this embodiment, content is served to a particular user based on that particular user's information record (instead of the approach described with reference to FIG. 3B). Since each group member's information record is updated based on group leader preferences, the group member's information record may be used to select their content.

A typical web page or application on a mobile device that contains links (URLs) for multiple targeted advertisements, and the process of selecting targeted ads for a particular user should not delay the page rendering. Thus, the determinations of a user's group membership (at 310) and the group's leadership (at 314), and the group leader's information record (at 316) preferably use pre-computed data that the ad server can query and/or lookup quickly, in real time (e.g., by a query to the backend platform). Changes in group membership and leadership may be determined separately by the backend platform, e.g., on a routine basis (e.g., every minute, every hour, daily, etc.).

For example, in exemplary implementations hereof, the database(s) 112 in the backend platform 114 may include user and group databases.

Preferably each registered user has a unique identification (ID) within the system. The user ID is preferably determined by the system based on the user's activity and information record. However, users may also register with the system in which case their user ID may be provided by the system. The user databases may provide a mapping from user IDs to corresponding user information records and to the user's group membership (if any), as shown in the user data 402 in FIG. 4. Each group preferably has a unique group ID within the system.

As used herein, the term "information record" refers, without limitation, to stored information, regardless of where or how the information is stored. For example, a user's information record may be stored on the user's device(s) and/or in one or more databases on the backend platform.

The group database(s) may also provide one or more tables that map group IDs to corresponding user IDs and to group leaders, as shown, e.g., in FIG. 4B.

Given a user's ID, the system (the backend platform 114) may determine the user's group membership by a table lookup of the user data 402. The group membership may be zero or more group IDs. If the user is not a member of any groups then the group membership information will be empty, otherwise it will be a list of one or more group IDs. If more than one group ID is present (the user is a member of multiple groups), then the system may select a group ID randomly from the list. Alternatively, the system may select the most recently determined group ID or the group ID with the most influential group leader.

Once a group ID is determined, the system may use that to lookup the group's current leader(s) in the group data 404. That leader information may be used with the user data 402 to lookup the information associated with the group leader. As there may be multiple group leaders, the system may pick one (e.g., at random or the most influential or by some other method).

Note that this processing/mapping (from user to group; and then from group to group leader; and then from group leader to group leader information record) preferably occurs in the backend platform 114. The ad server(s) 108 need only provide the backend platform with a user ID (e.g., via an API or the like).

In some cases, group leadership may be based on the user members' use of the voting mechanism 110. In these cases, the leaders will have given their actual opinions on prior ads and/or content, and so their information records may be considered more likely to be accurate than information records of users who do not use the voting mechanism 110 (or who do not use the voting mechanism 110 as much). Thus, in some cases, group leadership determination (as used, e.g., at 314) may weigh in favor of users use of the voting mechanism 110.

Figure 5:
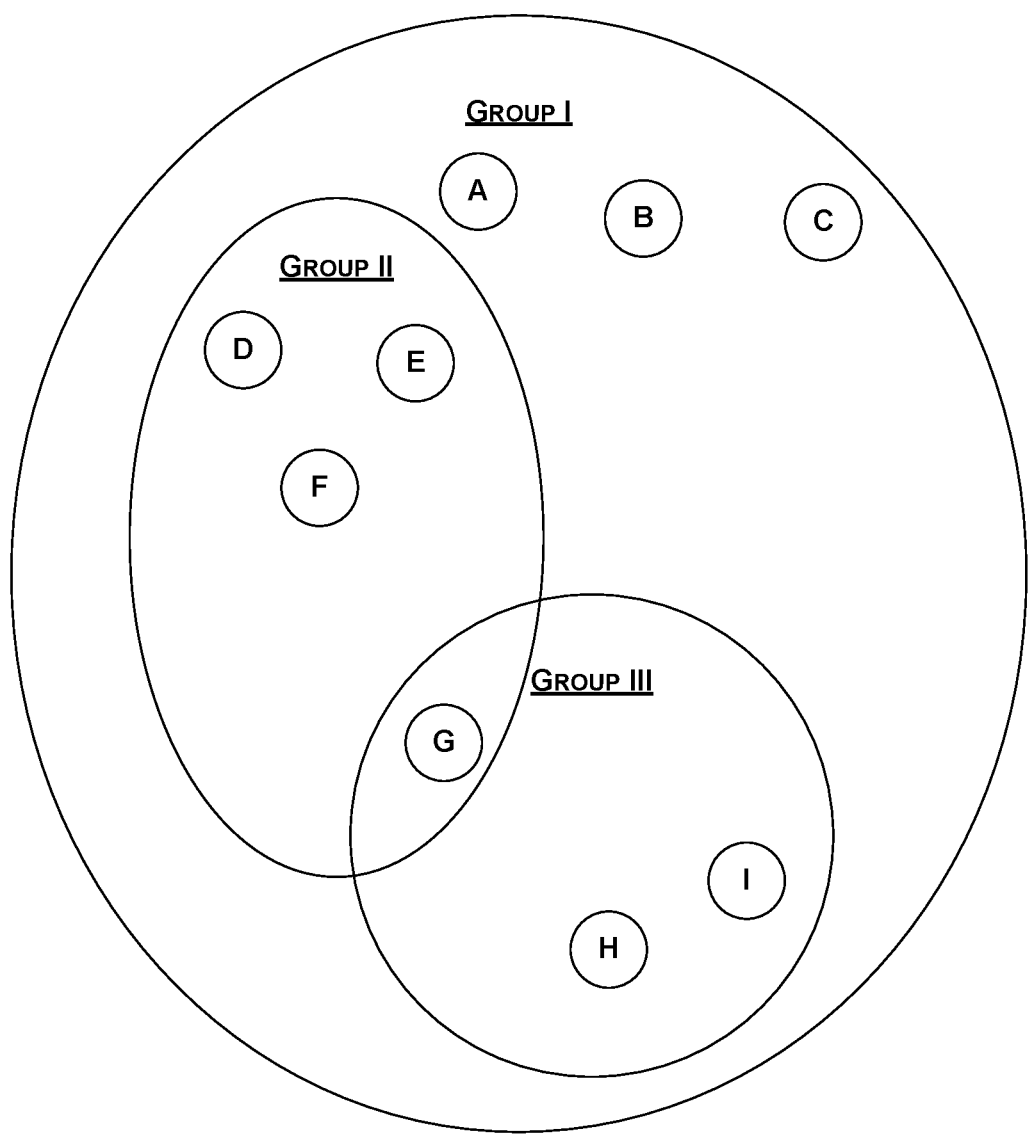
FIG. 5 depicts aspects of similarity groups according to exemplary embodiments hereof.

A user may be a member of multiple similarity groups. For example, as shown in FIG. 5, users A, B, C, D, E, F, G, H, and I are all members of similarity group I; users D, E, F, and G are all members of similarity group II; and users G, H, and I are all members of similarity group III. In this example, if user A votes (using a voting mechanism 110 associated with certain content), then user A is rewarded (per 322 in FIG. 3C), and the preference reflected in that vote is reflected in user A's information record (per 324 in FIG. 3C). If user A is determined (at 326 in FIG. 3C) to be a leader of similarity Group I (at the time of user A's vote), then the preference reflected user A's vote propagates to the information records of the followers in Group I (users B, C, D, E, F, G, H, and I). Continuing with this example, if user D then requests content, the content will be selected based on user D's information record (which now includes the preference reflected user A's vote).

In some cases, other information from the leader's information record (not just the preferences reflected in the most recent vote) may be used to update follower information records.

If user H votes, then user H will be rewarded and the preference reflected in that vote is reflected in user H's information record. If user H is not a group leader then that vote does not affect other user's information records. However, if at the time of the vote user H is a leader of Group III, then the preference reflected in that vote is propagated to the information records of users G and I.

In some cases, if a user becomes a group leader (having previously been a follower), that user's information record may be used to update information records of the group's followers.

Similarity

Similarity of users may be determined by users' domain activity, e.g., based on the similarity of their domain and/or environment logs or real-time data streams, where a domain or environment is, without limitation, and for example, any LAN, WAN, a wireless network, a router, a gateway, an application, or a device.

Similarity may be or include one or more of: frequency of visitation, date, duration within the environment or at the domain as determined from the logs or real time data streams.

For example, the activity logs and/or real-time data streams on a particular domain (e.g., a wireless network in a shopping mall) may be monitored and analyzed on a per device basis. Each device's activity may include visiting certain web sites (e.g., via a browser or via certain applications). Domain data associate with a device ID, preferably anonymized (e.g., by using a one-way hash), may be compared, thereby providing one or more measures of similarity.

Real-Time

Those of ordinary skill in the art will realize and understand, upon reading this description, that, as used herein, the term "real time" means near real time or sufficiently real time. It should be appreciated that there are inherent delays built in to networks such as the Internet (e.g., based on network traffic and distances), and these delays may cause delays in data reaching various components. Inherent delays in the system do not change the real-time nature of the data. In some cases, the term "real-time data" may refer to data obtained in sufficient time to make the data useful in providing feedback.

Although the term "real time" has been used here, it should be appreciated that the system is not limited by this term or by how much time is actually taken for data to have an effect on control information. In some cases, real time computation may refer to an online computation, i.e., a computation which produces its answer(s) as data arrive, and generally keeps up with continuously arriving data. The term "online" computation is compared to an "offline" or "batch" computation."

Computing

The applications, services, mechanisms, operations, and acts shown and described above are implemented, at least in part, by software running on one or more computers.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 6:
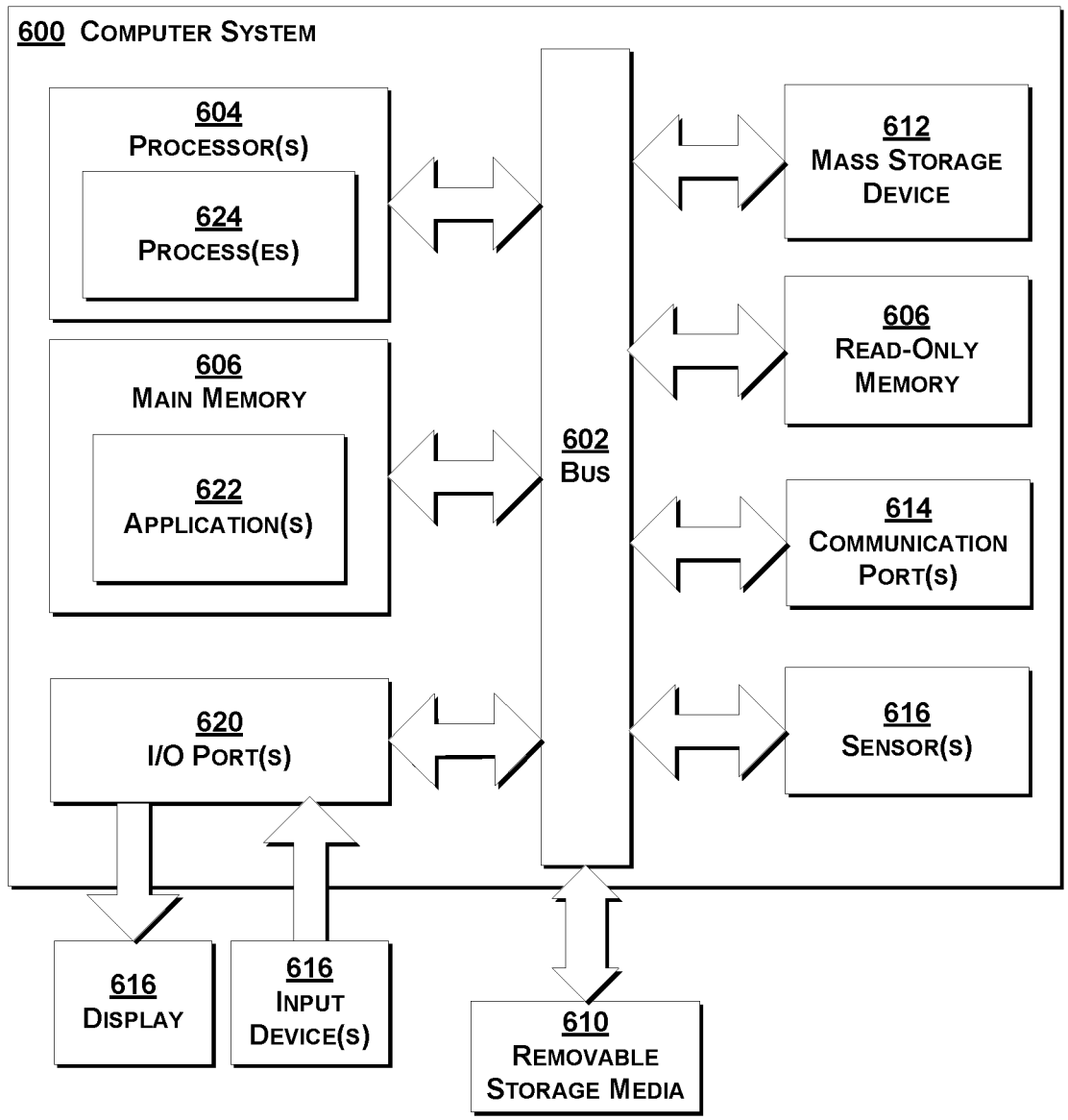
FIG. 6 depicts aspects of computing according to exemplary embodiments hereof.

FIG. 6 is a schematic diagram of a computer system 600 upon which embodiments of the present disclosure may be implemented and carried out.

According to the present example, the computer system 600 includes a bus 602 (i.e., interconnect), one or more processors 604, a main memory 606, read-only memory 608, removable storage media 610, mass storage 612, and one or more communications ports 614. Communication port(s) 614 may be connected to one or more networks (not shown) by way of which the computer system 600 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 604 can be any known processor, such as, but not limited to, an Intel® Itanium® or Itanium 2® processor(s), AMD® Opteron® or Athlon MP® processor(s), or Motorola® lines of processors, and the like. Communications port(s) 614 can be any of an Ethernet port, a Gigabit port using copper or fiber, or a USB port, and the like. Communications port(s) 614 may be chosen depending on a network such as a Local Area Network (LAN), a Wide Area Network (WAN), or any network to which the computer system 600 connects. The computer system 600 may be in communication with peripheral devices (e.g., display screen 616, input device(s) 618) via Input/Output (I/O) port 620.

Main memory 606 can be Random Access Memory (RAM), or any other dynamic storage device(s) commonly known in the art. Read-only memory (ROM) 608 can be any static storage device(s) such as Programmable Read-Only Memory (PROM) chips for storing static information such as instructions for processor(s) 604. Mass storage 612 can be used to store information and instructions. For example, hard disk drives, an optical disc, an array of disks such as Redundant Array of Independent Disks (RAID), or any other mass storage devices may be used.

Bus 602 communicatively couples processor(s) 604 with the other memory, storage and communications blocks. Bus 602 can be a PCI/PCI-X, SCSI, a Universal Serial Bus (USB) based system bus (or other) depending on the storage devices used, and the like. Removable storage media 610 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

The computer system 600 may access (e.g., read, store, etc.) data from remote storage devices (not shown), e.g., via one or more networks (not shown). Such remote storage devices may comprise so-called cloud storage.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 606 is encoded with application(s) 622 that support(s) the functionality as discussed herein (the application(s) 622 may be an application(s) that provides some or all of the functionality of the services/mechanisms described herein). Application(s) 622 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 604 accesses main memory 606 via the use of bus 602 in order to launch, run, execute, interpret or otherwise perform the logic instructions of the application(s) 622. Execution of application(s) 622 produces processing functionality of the service related to the application(s). In other words, the process(es) 624 represent one or more portions of the application(s) 622 performing within or upon the processor(s) 604 in the computer system 600.

It should be noted that, in addition to the process(es) 624 that carries(carry) out operations as discussed herein, other embodiments herein include the application 622 itself (i.e., the un-executed or non-performing logic instructions and/or data). The application 622 may be stored on a computer readable medium (e.g., a repository) such as a disk or in an optical medium. According to other embodiments, the application 622 can also be stored in a memory type system such as in firmware, read only memory (ROM), or, as in this example, as executable code within the main memory 606 (e.g., within Random Access Memory or RAM). For example, application(s) 622 may also be stored in removable storage media 610, read-only memory 608, and/or mass storage device 612.

Those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Conclusion

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used herein, including in the claims, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

As used herein, including in the claims, the term "automatic," with respect to an action, generally means that the action occurs with little or no human control or interaction. The term "automatic" also includes the case of no human control or interaction. Thus, e.g., the term "triggered automatically" means "triggered with little or no human control or interaction," and includes the case "triggered with no human control or interaction."

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

Any acts described in the specification may be performed in any order or simultaneously, unless the context clearly indicates otherwise.

All of the features and/or acts disclosed herein can be combined in any combination, except for combinations where at least some of the features and/or acts are mutually exclusive. In particular, preferred features of the invention are applicable to all aspects of the invention and may be used in any combination.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

Thus are provided systems and methods for delivering multimedia content to multiple participants at one or more physical locations.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-based content delivery method in a system in which content is delivered to user devices, the method comprising:
(A) receiving from a first user a request for content; and,
(B) based on said request, delivering particular content to said first user; and
(C) rewarding a second user, wherein the second user is rewarded based on delivery of said particular content to said first user,
wherein the second user is distinct from said first user, and
wherein said particular content was selected for delivery based on first information associated with said first user,
wherein the first information associated with the first user was based, at least in part, on at least one aspect of second information associated with the second user, and
wherein the first user and the second user are associated based on at least one measure of similarity, and
wherein the at least one aspect of the second information associated with the second user was selected based on prior use by the second user of a voting mechanism associated with certain prior content delivery,
wherein, at a time of said request, (i) said first user and said second user are members of a similarity group, and (ii) said second user is a leader of said similarity group and said first user is a follower in said similarity group, and
wherein leadership of the similarity group is dynamic, and wherein membership of the similarity group is determined based on at least one measure of similarity of the similarity group's members,
wherein said at least one measure of similarity is based on users' environment and domain activity with respect to other users, and
wherein the leader is a user determined based, at least in part, on prior use of voting mechanism associated with prior content delivery,
wherein said system comprises one or more databases in which are maintained first data structures associating users with user information records and user groups, and second data structures associating user groups with user group members and at least one user group leader,
wherein the first data structures provide a precomputed first mapping from user identifiers to corresponding: (i) user information records and (ii) user group membership, and
wherein the second data structures provide a precomputed second mapping from group identifiers to corresponding (iii) user identifiers and (iv) group leaders,
the method further comprising, before said receiving in (A):
(X) for a particular user of a plurality of users:
(X1) delivering content to said particular user, at least some of the content comprising or being delivered with a corresponding voting mechanism for said content,
wherein the corresponding voting mechanism for said content comprises code integrated in the content, and wherein the code runs or executes as part of rendering or running the content,
wherein the voting mechanism for said content provides the particular user with voting options in a voting user interface generated by the code, and
wherein the voting mechanism for said content allows a user to vote on or otherwise rank the content; and
(X2) tracking said particular user's (i) receipt of said voting mechanism, and/or (ii) display of said voting mechanism, and/or (iii) interaction with said voting mechanism;
(X3) logging environment and/or domain activity of said particular user; and (X4) assigning said particular user to one or more groups, said assigning being based on one or more measures of similarity of members of the one or more groups, where a measure of similarity is based on logged environment and/or domain activity of said particular user and logged environment and/or domain activity of other users, each of said one or more groups having a corresponding group identifier; and (X5) storing and/or updating information in said first data structures about group membership of said particular user, wherein said particular user has a particular user identifier, and wherein said storing and/or updating maps said particular user identifier to one or more group identifiers of the one or more groups to which the particular user was assigned in (X4); and (X6) storing and/or updating information in said second data structures about the one or more groups to which the particular user was assigned in (X4); and (Y) repeating step (X), including steps (X1) to (X6), for other users of said plurality of users.

2. The content delivery method of claim 1, wherein certain content is delivered with a voting mechanism, and wherein users are rewarded for said users' receipt and display of the voting mechanism.

3. The content delivery method of claim 1, wherein users are reward ed for using the voting mechanism.

4. The content delivery method of claim 1, wherein the second user was previously rewarded for said second user's (x) receipt and display and/or (y) use of the voting mechanism associated with said certain prior content delivery.

5. The content delivery method of claim 1, wherein the leadership of the similarity group is determined based, at least in part, on one or more users' prior use of a voting mechanism associated with certain prior content delivery.

6. The content delivery method of claim 1, wherein the particular content comprises targeted advertising.

7. The content delivery method of claim 1, wherein said voting mechanism was delivered as part of said certain prior content delivery.

8. The content delivery method of claim 7, wherein said certain prior content delivery comprised data in a markup and/or interpreted language and wherein said voting mechanism is part of said data.

9. The content delivery method of claim 1, wherein said particular content comprises a second voting mechanism.

10. The content delivery method of claim 1, wherein the first information associated with the first user comprises a first information record associated with the first user.

11. The content delivery method of claim 1, wherein a membership of the similarity group is determined by comparing one or more of a user's environment and/or domain activity with one or more other users' environment and/or domain activity.

12. The content delivery method of claim 11, wherein a user's environment comprises one or more of: a local area network (LAN), a wide area network (WAN), a wireless network, a router, a gateway, an application, and a device.

13. The content delivery method of claim 11, wherein the domain comprises a location on the Internet.

14. The content delivery method of claim 1, wherein the similarity group is based on at least one measure of similarity of users' domain and/or environment logs and/or real-time data streams.

15. The content delivery method of claim 11, wherein the at least one measure of similarity is based, at least in part, on one or more of: frequency of visitation, date, duration within the environment or at the domain, as determined from environment logs or real-time data streams.

16. A non-transitory computer-readable medium with one or more computer programs stored therein that, when executed by one or more processors of a device, cause the one or more processors to perform the method of claim 1.

17. A computer-based content delivery method in a system in which content is delivered to user devices, the method comprising:

(A) receiving from a first user a request for content;

(B) based on said request, delivering particular content to said first user; and (C) rewarding a second user, wherein the second user is rewarded based on delivery of said particular content to said first user, wherein the second user is distinct from said first user, and wherein said particular content was selected for delivery based on first information associated with said first user, wherein the first information associated with the first user was based, at least in part, on at least one aspect of second information associated with the second user distinct from said first user, and wherein the first user and the second user are associated based on at least one measure of similarity, and wherein the at least one aspect of the second information associated with the second user was selected based on prior use by the second user of a voting mechanism associated with certain prior content delivery, wherein, at a time of said request, (i) said first user and said second user are members of a similarity group, and (ii) said second user is a leader of said similarity group and said first user is a follower in said similarity group, and wherein leadership of the similarity group is dynamic, and wherein membership of the similarity group is determined based on at least one measure of similarity of the similarity group's members, wherein said at least one measure of similarity is based on users' environment and domain activity with respect to other users, and wherein a membership of the similarity group is determined by comparing one or more of (p) a user's environment and/or (q) domain activity with one or more other users' environment and/or domain activity, and wherein the leader is a user determined based, at least in part, on prior use of voting mechanism associated with prior content delivery, wherein said system comprises one or more databases in which are maintained first data structures associating users with user information records and user groups, and second data structures associating user groups with user group members and at least one user group leader, wherein the first data structures provide a precomputed first mapping from user identifiers to corresponding: (i) user information records and (ii) user group membership, and wherein the second data structures provide a precomputed second mapping from group identifiers to corresponding (iii) user identifiers and (iv) group leaders, the method further comprising, before said receiving in (A):

(X) for a particular user of a plurality of users:
- (X1) delivering content to said particular user, at least some of the content comprising or being delivered with a corresponding voting mechanism for said content,
    wherein the corresponding voting mechanism for said content comprises code integrated in the content, and wherein the code runs or executes as part of rendering or running the content,
    wherein the voting mechanism for said content provides the particular user with voting options in a voting user interface generated by the code, and
    wherein the voting mechanism for said content allows a user to vote on or otherwise rank the content; and
- (X2) tracking said particular user's (i) receipt of said voting mechanism, and/or (ii) display of said voting mechanism, and/or (iii) interaction with said voting mechanism;
- (X3) logging environment and/or domain activity of said particular user; and
- (X4) assigning said particular user to one or more groups, said assigning being based on one or more measures of similarity of members of the one or more groups, where a measure of similarity is based on logged environment and/or domain activity of said particular user and logged environment and/or domain activity of other users, each of said one or more groups having a corresponding group identifier; and
- (X5) storing and/or updating information in said first data structures about group membership of said particular user, wherein said particular user has a particular user identifier, and wherein said storing and/or updating maps said particular user identifier to one or more group identifiers of the one or more groups to which the particular user was assigned in (X4); and
- (X6) storing and/or updating information in said second data structures about the one or more groups to which the particular user was assigned in (X4); and (Y) repeating step (X), including steps (X1) to (X6), for other users of said plurality of users.

18. The content delivery method of claim 17, wherein the second user was previously rewarded for the second user's (x) receipt and display and/or (y) use of the voting mechanism associated with said certain prior content delivery.

* * * * *